United States Patent
Caulfield et al.

(10) Patent No.: US 7,281,001 B2
(45) Date of Patent: Oct. 9, 2007

(54) DATA QUALITY SYSTEM

(75) Inventors: Brian Caulfield, Dublin (IE); Garry Moroney, Donabare (IE); Padraig Cunningham, Blackrock (IE); Ronan Pearce, Dublin (IE); Gary Ramsay, Glenageary (IE); Sarah-Jane Delany, Blackrock (IE)

(73) Assignee: Informatica Corporation, Redwood City, CA (US)

( * ) Notice: Subject to any disclaimer, the term of this patent is extended or adjusted under 35 U.S.C. 154(b) by 436 days.

(21) Appl. No.: 10/768,979

(22) Filed: Feb. 2, 2004

(65) Prior Publication Data

US 2004/0158562 A1    Aug. 12, 2004

Related U.S. Application Data

(63) Continuation of application No. PCT/IE02/00117, filed on Aug. 2, 2002.

(30) Foreign Application Priority Data

Aug. 3, 2001  (IE) ................................. 2001/0744

(51) Int. Cl.
- *G06F 17/30* (2006.01)
- *G06F 7/00* (2006.01)

(52) U.S. Cl. ............... 707/3; 707/5; 707/102; 706/6; 706/37

(58) Field of Classification Search ........... 707/1–8, 707/10, 104.1, 101, 103 R, 102; 704/1, 9; 706/6, 15, 37, 44; 709/219, 224
See application file for complete search history.

(56) References Cited

U.S. PATENT DOCUMENTS

| | | | | |
|---|---|---|---|---|
| 5,255,310 A | * | 10/1993 | Kim et al. | 379/88.01 |
| 5,333,317 A | * | 7/1994 | Dann | 707/5 |
| 5,619,709 A | * | 4/1997 | Caid et al. | 715/532 |
| 5,724,597 A | * | 3/1998 | Cuthbertson et al. | 715/531 |
| 5,930,784 A | * | 7/1999 | Hendrickson | 707/2 |
| 6,065,003 A | | 5/2000 | Sedluk | 707/6 |
| 6,263,333 B1 | * | 7/2001 | Houchin et al. | 707/5 |
| 6,665,868 B1 | * | 12/2003 | Knowles et al. | 717/178 |
| 6,738,780 B2 | * | 5/2004 | Lawrence et al. | 707/101 |

OTHER PUBLICATIONS

Hernandez et al, ACM SIGMOD Intl Conf on Management, vol. 24, No. 2, pp. 127-138, May 1995, The Merge/Purge Problem for . . . .

Lujan-Mora et al, Intl Symp of Database Eng & Applns, pp. 209-218, Jul. 2001, Reducing Inconsistency in Integrating Data . . . .

* cited by examiner

*Primary Examiner*—Jeffrey Gaffin
*Assistant Examiner*—Jacques Veillard
(74) *Attorney, Agent, or Firm*—Fenwick & West, LLP

(57) ABSTRACT

A system (1) generates an output indicating scores for the extent of matching of pairs of data records. Thresholds may be set for the scores for decision-making or human review. A vector extraction module (12) measures similarity of pairs of fields in a pair of records to generate a vector. The vector is then processed to generate a score for the record pair.

17 Claims, 1 Drawing Sheet

DATA QUALITY SYSTEM

This is a continuation of PCT/IE02/00117 filed Aug. 2, 2002 and published in English.

INTRODUCTION

1. Field of the Invention

The invention relates to a data quality system.

2. Prior Art Discussion

Data quality is important for companies maintaining large volumes of information in the form of structured data. It is becoming an increasingly critical issue for companies with very large numbers of customers (for example banks, utilities, and airlines). Many such companies have already, or are about to, implement customer relationship management (CRM) systems to improve their business development. Effective operation of CRM systems involves drawing data from a range of operational systems and aggregating it on a customer-by-customer basis. This involves a large degree of data matching based on criteria such as customer identification details. Such matching and associated operations are often ineffective because of bad quality data. The data quality problems which often arise include:

empty fields;

lack of conformity, such as the letter "H" in a phone number field;

lack of consistency across fields of a record such as "customer status=live" and "last invoice date=20 Jan. 1999";

lack of integrity of field values; and duplicates.

In more detail, data matching difficulties arise from (a) the multitude of different ways in which two equivalent sets of data can differ, and (b) the very large volumes of data generally involved. This means that carrying out the task manually is impossible or hugely costly and defining a finite set of basic matching rules to automate the process is extremely difficult. As organisations collect more data from more sources and attempt to use this data efficiently and effectively they are encountering this problem more frequently and the negative impact is growing.

It is therefore an objective of the invention to provide a data quality system to improve data quality.

SUMMARY OF THE INVENTION

According to the invention, there is provided a data quality system for matching input data across data records, the system comprising:

means for pre-processing the input data to remove noise or reformat the data, means for matching record pairs based on measuring similarity of selected field pairs within the record, and for generating a similarity indicator for each record pair.

In one embodiment, the matching means comprises means for extracting a similarity vector for each record pair by generating a similarity score for each of a plurality of pairs of fields in the records, the set of scores for a record pair being a vector.

In another embodiment, the vector extraction means comprises means for executing string matching routines on pre-selected field pairs of the records.

In a further embodiment, a matching routine comprises means for determining an edit distance indicating the number of edits required to change from one value to the other value.

In one embodiment, a matching routine comprises means for comparing numerical values by applying numerical weights to digit positions.

In another embodiment, the vector extraction means comprises means for generating a vector value between 0 and 1 for each field pair in a record pair.

In a further embodiment, the matching means comprises record scoring means for converting the vector into a single similarity score representing overall similarity of the fields in each record pair.

In one embodiment, the record scoring means comprises means for executing rule-based routines using weights applied to fields according to the extent to which each field is indicative of record matching.

In another embodiment, the record scoring means comprises means for computing scores using an artificial intelligence technique to deduce from examples given by the user an optimum routine for computing the score from the vector.

In a further embodiment, the artificial intelligence technique used is cased based reasoning (CBR).

In one embodiment, the artificial intelligence technique used comprises neural network processing.

In another embodiment, the pre-processing means comprises a standardisation module comprising means for transforming each data field into one or more target data fields each of which is a variation of the original.

In a further embodiment, the standardisation module comprises means for splitting a data field into multiple field elements, converting the field elements to a different format, removing noise characters, and replacing elements with equivalent elements selected from an equivalence table.

In one embodiment, the pre-processing means comprises a grouping module comprising means for grouping records according to features to ensure that all actual matches of a record are within a group, and wherein the matching means comprises means for comparing records within groups only.

In a further embodiment, the grouping module comprises means for applying labels to a record in which a label is determined for a plurality of fields in a record and records are grouped according to similarity of the labels.

In one embodiment, a label is a key letter for a field.

In another embodiment, the system further comprises a configuration manager comprising means for applying configurable settings for the pre-processing means and for the matching means.

In a further embodiment, the system further comprises a tuning manager comprising means for refining, according to user inputs, operation of the record scoring means.

In one embodiment, the tuning manager comprises means for using a rule-based approach for a first training run and an artificial intelligence approach for subsequent training runs.

DETAILED DESCRIPTION OF THE INVENTION

Brief Description of the Drawings

The invention will be more clearly understood from the following description of some embodiments thereof, given by way of example only with reference to FIG. 1, which is a block diagram illustrating a data quality system of the invention.

DESCRIPTION OF THE EMBODIMENTS

Figure 1:
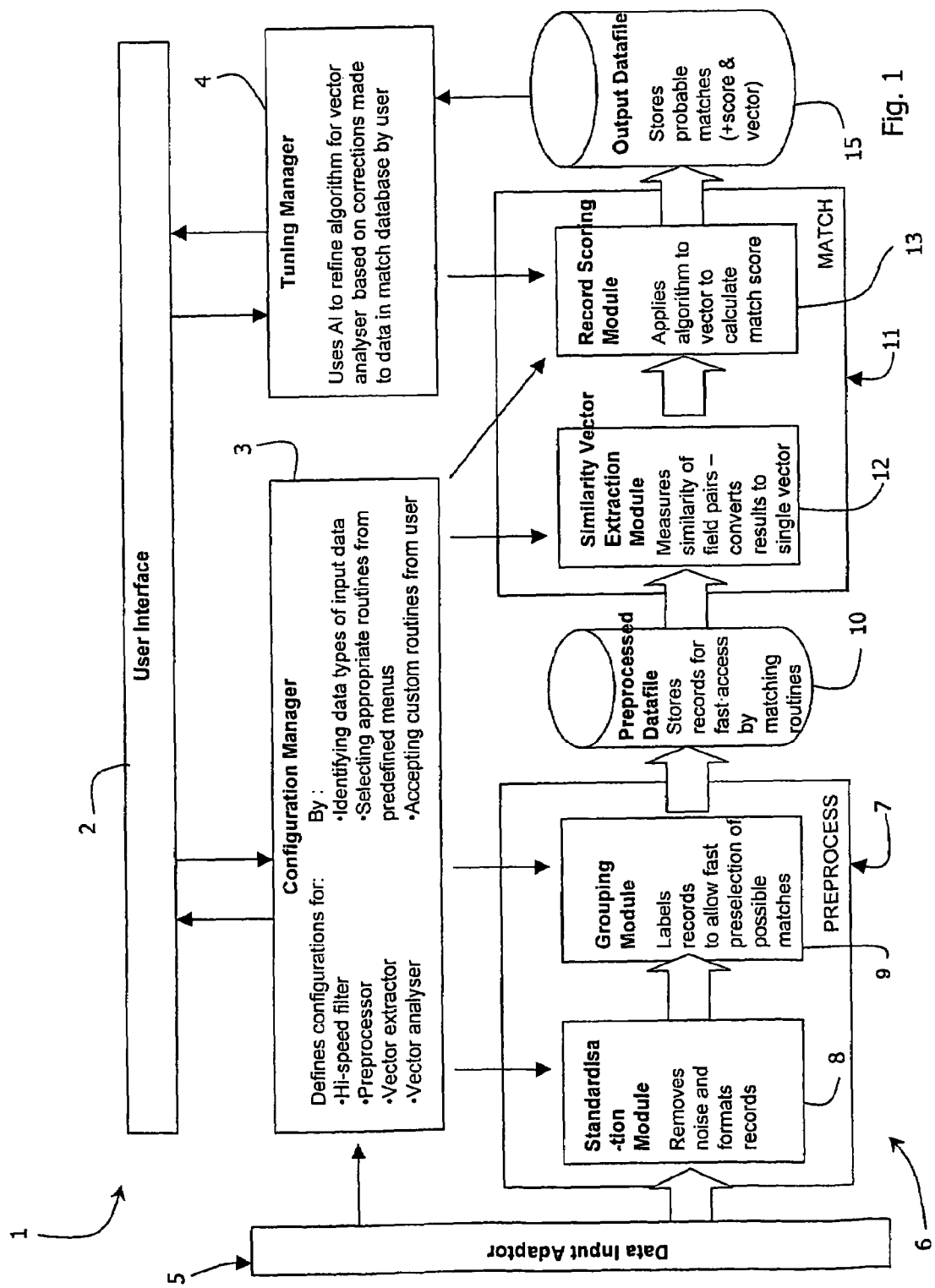

Referring to FIG. 1, a data quality system 1 comprises a user interface 2 linked with a configuration manager 3 and a tuning manager 4. A data input adapter 5 directs input data to a pipeline 6 which performs data matching in a high-speed and accurate manner. The pipeline 6 comprises:
- a pre-processor 7 having a standardisation module 8 and a grouping module 9,
- a matching system 11 comprising a similarity vector extraction module 12 and a record scoring module 13.

The output of the pipeline 6 is fed to an output datafile 15.

The system 1 operates to match equivalent but non-identical information. This matching enables records to be amended to improve data quality.

The system 1 ("engine") processes one or multiple datasets to create an output data file containing a list of all possible matching record pairs and a similarity score. Depending on the needs of the user the engine can then automatically mark certain record pairs above a specified score as definite matches and below a specified score as non-matches. Record pairs with scores between these two thresholds may be sent to a user interface for manual verification.

There are a number of discrete activities within the matching process. These can be grouped into two separate phases:—pre-processing and matching Pre-processing In the pre-processing phase all data records are read sequentially from the data input adapters 5. Firstly each record is fed to the standardisation module 8 where a range of different routines are applied to generate an output record which can be matched more effectively with other records. Each record is then fed to a grouping module 9. In this process labels are attached to each record to enable it to be easily and quickly grouped with other similar records. This makes the downstream matching process more efficient as it eliminates the need to compare records which are definitely non matches. Following the grouping process the output record (transformed and labelled) is written to the pre-processed datafile.

Matching

In the matching phase, each record is read in sequence from the pre-processed dataset 10. It is then compared to each similar record in the dataset—i.e. records within the same group. The comparison process involves:
1. Similarity Vector Extraction: This involves comparing individual fields within a record pair using matching algorithms to generate a similarity score for each pair of fields. Data element scoring is carried out on a number of field pairs within the record pair to generate a set of similarity scores called a similarity vector.
2. Data record Scoring: Once a similarity vector has been produced for a record pair by a series of data element scoring processes, the data record scoring process converts the vector into a single similarity score. This score represents the overall similarity of the two records.

The pair of output records is then written to the output datafile along with the similarity score. The matching phase then continues with the next pair of possible matching pairs.

To achieve high accuracy matching, the setup of the modules is highly specific to the structure and format of the dataset(s) being processed. A key advantage of the engine is built-in intelligence and flexibility which allow easy configuration of optimum setup for each of the modules. Initial setup of the four processing modules is managed by the configuration manager 3 and the tuning manager 4.

Standardisation ("Transformation") Module 8

The aim of the transformation process is to remove many of the common sources of matching difficulty while ensuring that good data is not destroyed in the process. This is done by transforming the individual elements of a record into a range of different formats which will aid the matching process. Each data field in a record is transformed into a number of new data fields each of which is a variation of the original.

Each data record is read in turn from the adaptor 5. Each field within a record is processed by applying a number of predefined transformation routines to the field. Each transformation routine produces a new output data field. Thus, an output record is produced containing a number of data fields for each field in the input record. Field transformation routines include:
- Splitting a data field into multiple fields, for example splitting street address into number, name and identifier.
- Converting field elements to other format using conversion routines, for example:
  - Converting to uppercase.
  - Converting to phonetic code (Soundex).
  - Convert to abbreviated version.
  - Convert to standardised format (e.g. international telephone codes).
  - Convert to business-specific version.
- Removal of characters from within data field, for example:
  - Removal of spaces between specified elements.
  - Removal of specified symbols from between specified elements (e.g. punctuation marks/hyphens).
- Replacement of element with an equivalent element selected from an equivalence table, for example:
  - Replacement of nickname shortened name with root-name.
  - Replacement of Irish/foreign language place or person name with English equivalent.
  - Replacement of standard abbreviations with root term (st. to street, rd. to road etc.).
  - Replacement of company name with standardised version of name.

The transformation module 8 is capable of carrying out a user-defined number of transforms such as those above to each input data field and generating a user-defined number of output fields for each input field. The transforms required for each field type may be configured by:
- Selecting from a menu of default transformation configurations (set of routines) predefined for use with a particular field type of a particular structure/format/quality level.
- Developing new configurations for each data field/element from a menu of transformations such as those above.
- Developing new configurations for each data field/element using bespoke transformations input by the user—probably combined with some predefined transformations.

In batch matching projects the transformation process is carried out on the whole database before any matching is done. A new data file of transformed elements is then created for use in the matching process. This saves time by ensuring that the minimum number of transformations N are carried out (where N=number of records in the database) rather than the potential maximum number of transformations N×N.

However in realtime search and match operation the transformation process is carried out directly before the matching process for each record.

The following is a transformation example.

| Input Record: | | | | | | |
|---|---|---|---|---|---|---|
| Firstname | Surname | Address1 | Address2 | Address3 | DOB | Telephone |
| John | O'Brien | 3 Oak Rd. | Douglas | Co. Cork | 20/4/66 | 021-234678 |

| Output Record | | | | | | | | | |
|---|---|---|---|---|---|---|---|---|---|
| FN_stan | FN_Soundex | FN_Root | SN_stan | SN_Soundex | SN_root | A1_Num | A1_text | A1_text_soundex | |
| John | Jon | Jonathon | OBrien | O-165 | Brien | 3 | Oak | O-200 | |
| FN_stan | A1_st | A2_text | A2_str_soundex | A3_st | A3_text | DOB_Eur | DOB_US | Telephone | Tel_local |
| John | Road | Douglas | Duglass | County | Cork | 20041966 | 04201966 | 35321234678 | 234678 |

Grouping Module 9

The aim of the data record grouping process is to significantly speed up the matching step by reducing the number of record pairs which go through the set of complex match scoring routines. This is done by grouping records which have certain similar features—only records within the same group are then compared in the matching phase. (This greatly reduces the number of matching steps required from N×N to G×H×H where G is the number of groups and H is the number of elements per group).

The module 9 ensures that all actual matches of any record are contained within the same group. The grouping process must be kept simple so that minimal processing time is required to identify elements in the same group. In addition, to have a real impact on efficiency the groups must be substantially smaller than the full dataset (at least 10 times)

After the transformation process is performed on an individual data record a further set of predefined routines is applied to certain fields of the record. These routines extract features from the data fields. These features are included in a small number (2-4) of extra data fields appended to the output record. These labels allow the record to be grouped with other similar records.

The key attributes of the labels are:

Must be very high probability (99.999%) that all matching records have some or all of the same labels.

Labels must be easily extracted from the data fields.

Labels must be impervious to any range data errors which have not been corrected by the transformation process, for example, spelling errors, typing errors, different naming conventions, and mixed fields.

The grouping process is a high speed filtering process to significantly reduce the amount of matches required rather than as a substitute for the matching process. As such, in order to keep the grouping process simple but ensure that no matches are missed, each group is large and the vast majority of records within a group will not match.

An example of the type of routine used in the grouping process is a keyletter routine. The keyletter is defined as the most important matching letter in the field—generally the first letter of the main token—J for John, B for oBrien, O for Oak, D for Douglas, C for Cork. For example the label fields may then contain: first letters of firstname, surname, address 1 and address 2.

The grouping criteria may then be set to: X(2 to 4) number of common labels. Matching is only carried out on records whose label fields contain two or more of the same letters. The keyletter may also be derived from the soundex fields.

In many cases keyletter may not be the appropriate labelling routine. The grouping module must have the flexibility to allow the user to define a number of bespoke labelling routines appropriate to the dataset (for example—if a particular data element within a dataset has a particularly high confidence level, grouping may be focused largely on this). He may do this by:

a. selecting a default grouping configuration predefined for this type of dataset, b. firstly selecting the most appropriate fields, secondly selecting the appropriate labelling routines from a menu, thirdly defining the grouping criteria for the labels, or c. as above but inputting customised labelling routines.

EXAMPLE

| Input Record: | | | | | | |
|---|---|---|---|---|---|---|
| Firstname | Surname | Address1 | Address2 | Address3 | DOB | Telephone |
| John | O'Brien | 3 Oak Rd. | Douglas | Co. Cork | 20/4/66 | 021-234678 |

| Output Record | | | | | | | | | |
|---|---|---|---|---|---|---|---|---|---|
| FN_stan | FN_Soundex | FN_Root | SN_stan | SN_Soundex | SN_root | A1_Num | A1_text | A1_text_soundex | |
| John | Jon | Jonathon | OBrien | O-165 | Brien | 3 | Oak | O-200 | |
| FN_stan | A1_st | A2_text | A2_text_nysiis | A3_st | A3_text | DOB_Eur | DOB_US | Telephone | Tel_local |
| John | Road | Douglas | DAGL | County | Cork | 20041966 | 04201966 | 35321234678 | 234678 |

| Output Record Grouping Labels | | | | |
|---|---|---|---|---|
| FN_keyletter | SN_keyletter | A1_keyletter | A2_keyletter | A3_keyletter |
| J | B | O | D | C |

Similarity Vector Extraction Module 12

Each data field within a record is compared with one or more fields from the other record of a pair being compared. All records in each group are compared with all of the other records in the same group. The objective here is to ensure that equivalent data elements are matched using an appropriate matching routine even if the elements are not stored in equivalent fields.

Each pair of records is read into the vector extraction module from the preprocessed datafile. This module firstly marks the data fields from each record which should be compared to each other. It then carries out the comparison using one of a range of different string matching routines. The string matching routines are configured to accurately estimate the "similarity" of two data elements. Depending on the type/format of the data elements being compared, different matching routines are required. For example, for a normal word an "edit distance" routine measures how many edits are required to change one element to the other is a suitable comparison routine. However for an integer it is more appropriate to use a routine which takes into account the difference between each individual digit and the different importance level of the various digits (i.e. in number 684 the 6 is more important than the 8 which is more important than the 4). Examples of matching routines are edit distance, hamming distance, dyce, and least common substring routines.

The output of the matching routine is a score between 0 and 1 where 1 indicates an identical match and 0 indicates a definite nonmatch. The output of a data field scoring routine is a set of similarity scores one for each of the datafield pairs compared. This set of scores is called a similarity vector.

The module 12 allows the user to select the data fields within the dataset/(s) to be used in the matching process, to select which fields are to be matched with which, and to define the matching routine used for each comparison. The user configures the process by:
  selecting from a menu of default configurations suitable for the dataset(s),
  manually selecting the data fields to be compared and selecting the appropriate matching routine from a menu of predefined routines, and
  manually creating customised matching routines to suit particular data field types.

EXAMPLE

| Input Record 1 | | | | | | | | | |
|---|---|---|---|---|---|---|---|---|---|
| FN_stan | FN_Soundex | FN_Root | SN_stan | SN_Soundex | SN_root | A1_Num | A1_text | A1_text_soundex | |
| John | J-500 | Jonathon | OBrien | O-165 | Brien | 3 | Oak | O-200 | |
| FN_stan | A1_st | A2_text | A2_str_soundex | A3_st | A3_text | DOB_Eur | DOB_US | Telephone | Tel_local |
| John | Road | Douglas | D242 | County | Cork | 20041966 | 04201966 | 35321234678 | 234678 |

| Input Record 2 | | | | | | | | | | |
|---|---|---|---|---|---|---|---|---|---|---|
| FN_stan | FN_Soundex | FN_Root | SN_stan | SN_Soundex | SN_root | A1_Num | A1_text | A1_text_soundex | A1_st | A2_text |
| Jon | J-500 | Jonathon | Bryan | B-650 | Brien | — | Oakdale | O-234 | Close | Oake |
| FN_stan | A2_text_sdx | A2_st | A3_text | A4_st | A4_text | A4_text_sdx | DOB_Eur | DOB_US | Telephone | Tel_local |
| Jon | O-230 | Road | Duglass | County | Cork | C-620 | 02041968 | 04021968 | | |

| Output Similarity Vector | | | | | | | | | | | | |
|---|---|---|---|---|---|---|---|---|---|---|---|---|
| FN_stan | FN_Root | SN_stan | SN_root | A1_Num | A1_text | A1_st | A2_text | A2_st | A3_text | A4_st | A4_text | |
| .7 | 1 | .5 | 1 | .5 | .5 | 0 | 0 | 0 | 0 | 0 | 0 | |
| FN_stan | A1A2_text | A2A1_text | A2A3_text | A3A2_text | A3A4_txt | DOB_Eur | DOB_US | Telephone | | Tel_local | | |
| .7 | .8 | 0 | .8 | 0 | 1 | .8 | .8 | — | | — | | |

The output of the data field matching process is a vector of similarity scores indicating the similarity level of the data fields within the two records. The data field matching module is capable of doing a user-defined number and type of comparisons between two data records and generating a score for each—i.e. the user will define which fields/elements of one record will be compared to which elements in the other record. The user will also define which matching algorithm is used for each comparison. In defining these parameters the user can:

Select a default matching configuration stored in the system 1 for a specified field type.

Select the required matching routine for a particular data field type from a menu of predefined routines.

Input a customised matching routine

Data Record Scoring Module 13

The aim of the data record scoring is to generate a single similarity score for a record pair which accurately reflects the true similarity of the record pair relative to other record pairs in the dataset. This is done by using a variety of routines to compute a similarity score from the similarity vector generated by the module 12.

There are two different types of routine used by the module 13 to generate a score.

Rule-based routines—these routines use a set of rules and weights to compute an overall score from the vector. The weights are used to take into account that some fields are more indicative of overall record similarity than others. The rules are used to take into account that the relationship between individual field scores and overall score may not be linear. The following is an example of a rule based computation.

FN=Largest of (FN_stan, FN_Root)

SN=Largest of (SN_stan, FN_Root)

A1_text=Largest of (A1_text, A1A2_text)

A2_text=Largest of (A2_text, A2A1_text, A2A3_text)

A3_text=Largest of (A3_text, A3A2_text)

DOB=Largest of (DOB_Eur, DOB_US)

Score=$FN+SN+A1$_text+$A2$_text+$A3$_text+$A4$_text+ ($A1st+A2st+A3st+A4st$)/4

AI based routines—these routines automatically derive an optimum match score computation algorithm based on examples of correct and incorrect matches identified by the user. Depending on the situation—the type of AI technology used may be based on either neural networks or case based reasoning.

The optimum routine required to derive the most accurate similarity scores for all record pairs are highly specific to the types and quality of data within a particular dataset. For this reason default routines generally do not give the best match accuracy. In order to achieve top levels of accuracy, a trial and error process is implemented by the tuning manager 4 to "tune" the scoring routine. This requires the user to:

run the whole matching process a number of times for a portion of the dataset.

inspect the results after each run to check the proportion of correct and incorrect matches.

manually adjust the parameters of the score computation routine.

This process is difficult to do with a rule based routine as there are a large number of variables to tweak. However the AI based system is ideal for this process. It removes the need to tweak different variables as the AI technology derives a new score computation routine automatically based on the learning from the manual inspection of the match results. Since the AI process requires training data, the system 1 uses a rule based routine on the first training run and uses an AI routine thereafter.

The record scoring module 13 is configured to allow user selection or setup of both the rules based and AI-based routines. The user configures the rule based routine by:

Selecting from a menu of rule-based routine configurations predefined for common dataset types.

Selecting a predefined configuration but adjusting individual parameters (e.g. weighting of a certain field type).

Defining a customised routine.

The user will setup the AI based routine by:

Selecting a recommended AI-based routine for the particular matching conditions (one-off batch matching, ongoing periodic matches etc.)

Selecting from a menu of configurations of that AI-based routine predefined for common dataset types.

Selecting a predefined configuration but adjusting individual parameters.

It will be appreciated that the system achieves fast and easy set up and configuration of new matching processes involving new datasets or match criteria, and easy set up of adhoc matching analyses. The system also achieves scheduling of ongoing periodic matching processes using predefined configurations. The system is callable from third party applications or middleware, and it has the capability to read data from a range of input data formats, and to provide a range of output data functions.

Important advantages of the system are:

1. Accuracy. It is capable of delivering highly accurate automated matching through the use of complex layers of processing and matching routines to compensate for the full range of data matching problems. It minimises the number of true matches not identified and non-matches labelled as matches.

2. Configurability. It enables easy setup of customised routines often required due to the highly specific nature of individual datasets. It allows the user to select parameters based on knowledge of which fields are likely to be most indicative of a match, likely quality of individual fields, and likely problems with fields/elements. The system 1 uses "wizard" type process to help the user to configure bespoke routines to remove problem characters within fields, and transform elements into standardised formats.

3. Ease of set up. There is built-n intelligence to facilitate high accuracy set up and tuning by a non-expert user. Setup is based on users knowledge of the data, and it guides user on development of processing routines. Articial intelligence is used to automatically tune the matching process based on examples of good and bad matches as verified by user.

4. Speed: It uses intelligent processing to quickly reduce a dataset to a subset of "all possible matches". The high-speed pipeline 6 maximises processing speed.

5. Open Architecture. The architecture uses component—based design to facilitate easy integration with other systems or embedding of core engine within other technologies.

The system of the invention is therefore of major benefit to businesses by, for example:
improving the value of data so that it is business-ready;
reducing project risks and time overruns in data migration projects; and
reducing manual verification costs.

The system is also very versatile as it may interface on the input side with any of a wide range of legacy systems and output cleaned data to a variety of systems such as CRM, data-mining, data warehouse, and ERP systems. Furthermore, the structure of the system allows different modes of operation including interactive data cleaning for data projects, batch mode for embedded processes, and real time mode for end-user applications.

The invention is not limited to the embodiments described but may be varied in construction and detail.

The invention claimed is:

1. A computer implemented data quality system executed by a computer server for matching input data across record pairs of data stored in and retrieved from the computer server, the system comprising:

training means, comprising, for a training data set comprising a portion of the data set:

means for matching pairs of records of the training data set by matching pairs of data fields between each pair of records to generate for each pair of records a similarity vector comprising a plurality of similarity scores, each similarity score associated with a pair of data fields;

means for applying a set of rules to the data fields of the records and for applying weights to the plurality of similarity scores of each similarity vector for the training data set to calculate an overall similarity score for each pair of records in the training data set; and means for determining, in response to user feedback with respect to the training data set, a set of adjusted rules and weights;

for a non-training data set comprising unmatched pairs of records of the data set, means for matching the pairs of records of the non-training data set by matching pairs of data fields between each pair of records to generate similarity vectors for the pairs of records of the non-training data set;

means for applying the set of adjusted rules and weights to similarity scores of the similarity vectors for the pairs of records of the non-training data set to calculate an overall similarity score for each pair of records in the non-training data set.

2. A system as claimed in claim 1, wherein the means for matching pairs of records of the training data set comprises means for executing string matching routines on pre-selected field pairs of the records.

3. A system as claimed in claim 2, wherein a selected string matching routine comprises means for determining an edit distance indicating the number of edits required to change from one value to another value.

4. A system as claimed in claim 2, wherein a selected string matching routine comprises means for comparing numerical values by applying numerical weights to digit positions.

5. A system as claimed in claim 1, wherein the means for matching pairs of records of the training data set comprises means for generating a vector value between 0 and 1 for each pair of data fields in a pair of records.

6. A system as claimed in claim 1, wherein the means for matching pairs of records of the training data set comprises record scoring means for converting a similarity vector into an overall similarity score representing overall similarity of the fields in each record pair.

7. A system as claimed in claim 6, wherein the record scoring means comprises means for computing scores using an artificial intelligence technique to deduce from examples given by the user an optimum routine for computing the overall similarity score from the vector.

8. A system as claimed in claim 7, wherein the artificial intelligence technique used is case based reasoning (CBR).

9. A system as claimed in claim 7, where the artificial intelligence technique used comprises neural network processing.

10. A system as claimed in claim 6, wherein the system further comprises a tuning manager comprising means for refining, according to user inputs, operation of the record scoring means.

11. A system as claimed in claim 10, wherein the tuning manager comprises means for using a rule-based approach for a first training run and the artificial intelligence approach for subsequent runs.

12. A system as claimed in claim 1, further comprising a pre-processing means for reformatting the data set, further comprising a standardization module comprising means for transforming each data field into one or more target data fields each of which is a variation of the original.

13. A system as claimed in claim 12, wherein the standardization module comprises means for splitting a data field into multiple field elements, converting the field elements to a different format, removing noise characters, and replacing elements with equivalent elements selected from an equivalent table.

14. A system as claimed in claim 12, wherein the pre-processing means comprises a grouping module comprising means for grouping records according to features to ensure that all actual matches of a record are within a group, and wherein the means for matching pairs of records of the training data set comprises means for comparing records within groups only.

15. A system as claimed in claim 14, wherein the grouping module comprises means for applying labels to a record in which a label is determined for a plurality of fields in the record and records are grouped according to similarity of the labels.

16. A system as claimed in claim 15, in which a label is a key letter for a field.

17. A system as claimed in claim 12, wherein the system further comprises a configuration manager comprising means for applying configurable settings for the preprocessing means and for the means for matching pairs of records of the training data set.

* * * * *

UNITED STATES PATENT AND TRADEMARK OFFICE
CERTIFICATE OF CORRECTION

PATENT NO.         : 7,281,001 B2                                     Page 1 of 1
APPLICATION NO. : 10/768979
DATED              : October 9, 2007
INVENTOR(S)        : Brian Caulfield et al.

It is certified that error appears in the above-identified patent and that said Letters Patent is hereby corrected as shown below:

Title Page, Inventors, item (75);
After Moroney, please delete "Donabare" and insert --Donabate--

Signed and Sealed this

Sixth Day of May, 2008

JON W. DUDAS
*Director of the United States Patent and Trademark Office*